(No Model.)
W. BLACK.
LIFE GUARD FOR STREET CARS.
No. 548,173. Patented Oct. 22, 1895.
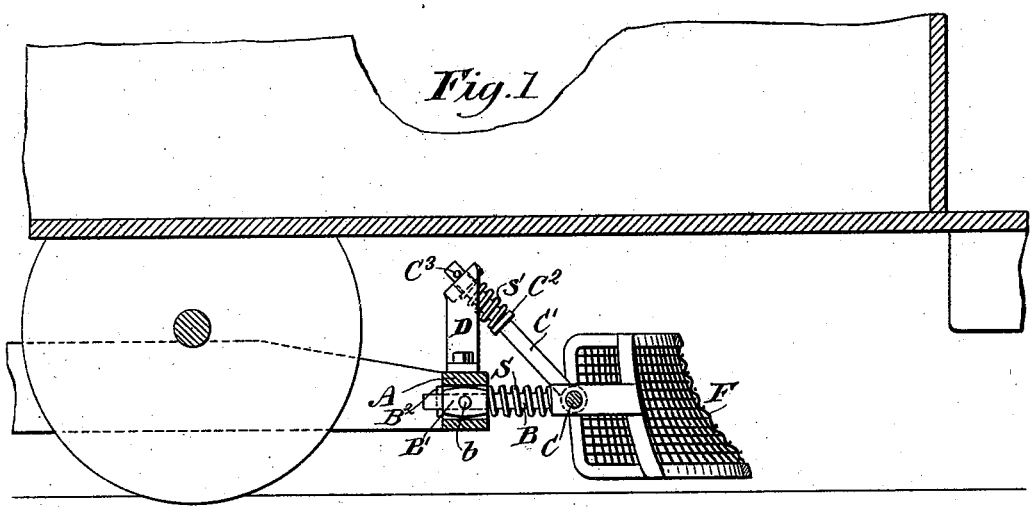
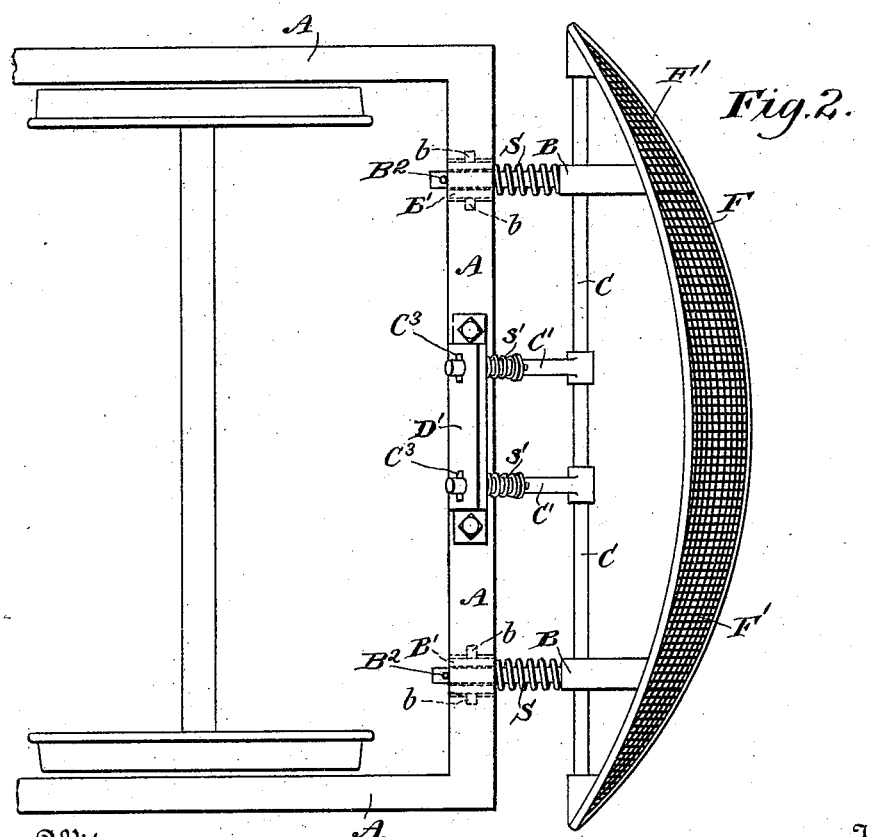
Witnesses
Edward Thorpe
John F. Couch
Inventor
William Black
By his Attorney
Edward Fassett

UNITED STATES PATENT OFFICE.

WILLIAM BLACK, OF NEW YORK, N. Y., ASSIGNOR OF ELEVEN-TWENTIETHS TO EDWARD HASSETT, OF SAME PLACE, AND JOHN F. COUCH, OF BROOKLYN, NEW YORK.

LIFE-GUARD FOR STREET-CARS.

SPECIFICATION forming part of Letters Patent No. 548,173, dated October 22, 1895.

Application filed April 14, 1894. Serial No. 507,597. (No model.)

*To all whom it may concern:*

Be it known that I, WILLIAM BLACK, a citizen of the United States, and a resident of the city, county, and State of New York, have invented a new and useful Improvement in Life-Guards for Street-Cars, of which the following is a specification.

The object of this invention is to provide cars with a receding fender.

The invention consists in a pivoted spring frame or support for a car-fender, an inclined spring bar to hold and dip the fender, and a bracket to support the fender-frame and the inclined bar.

Figure 1 shows a side view of the fender and its operating parts, and Fig. 2 is a top view of Fig. 1.

A in the figures represents a truck-frame of a car to which the improvements are secured.

B' B', Figs. 1 and 2, are trunnion-blocks supported by the truck-frame A and turning on the trunnions $b$ $b$.

B B in the figures are bars to which the fender-frame F is secured. The tenon or small ends of these bars pass through the trunnion-blocks B' B', and are held in the blocks B' B' by the pins $B^2$ $B^2$.

F, Figs. 1 and 2, represents a fender-frame rigidly secured to the bars B B and provided with the usual netting F'.

C, Figs. 1 and 2, is a shaft secured to the ends of the fender-frame F and passes through the bars B B to which it is fastened.

S S are spirally-coiled springs fitted onto the tenon of the bars B.

D, Figs. 1 and 2, represents vertical brackets secured to the truck-frame A, provided with a top D'. (Shown in Fig. 1.) Two holes are cut through the top pieces D', which are of sufficient size to allow the bars C' to swing back and forth as the fender is pressed back.

C' C' are inclined sliding bars loosely sleeved onto the shaft C, provided with collars $C^2$ to hold the springs S' S'. The pins $C^3$ $C^3$ support the fender F and bars B a given distance above the road-bed when the fender and bars are in their normal condition, as shown in Fig. 1.

The springs S' S' should be stronger than springs S S, as by this arrangement the fender will be forced back and down to or near the road-bed when the fender comes in contact with an object. The fender can be extended beyond the car-front, but preferably it is located as shown, which prevents the fender from being injured by teams.

The operation is as follows: The fender on striking an object upon the road-bed is forced back by the springs S S being compressed. Immediately as the fender commences to recede, the bars C' and springs S' S' force the fender down. Thus it will be readily seen that a person will only receive a receding blow when struck, and is prevented from being drawn under the fender by its downward movement.

Having thus fully described my invention, what I claim as new, and desire to secure by Letters Patent of the United States, is—

1. A car fender having frame F. net F'. shaft C. and rods B., the said rods B. sliding and swinging in the trunnion blocks B'. and automatically moved forward by springs S. S. in combination with the spring actuated rods C'. to support the fender at a given elevation from the road-bed and to automatically lower the fender as and for the purpose described.

2. A car provided with a truck frame A. the said truck frame A. supporting trunnion blocks B'. and brackets D. in combination with a car fender having frame F. and net F'. the said frame F. having fixed rods B. shaft C. and rods C'. the said rods B. and C'. being actuated by the springs S. and S'. as and for the purpose described.

3. A car provided with a truck frame A. the said truck frame A. supporting trunnion blocks B' and brackets D., in combination with a car fender having frame F. and net F', the said frame F. having fixed rods B. provided with pins $B^2$, shaft C. and rods C'. provided with pins $C^3$, the said rods B. and C'. being actuated by the springs S. and S' as and for the purpose described.

In testimony that I claim the foregoing as my invention I have signed my name, in presence of two witnesses, this 7th day of April, 1894.

WILLIAM BLACK.

Witnesses:
JOHN P. COHALAN,
JOHN F. COUCH.